United States Patent [19]

Seko

[11] Patent Number: 5,007,238
[45] Date of Patent: Apr. 16, 1991

[54] APPARATUS FOR EVAPORATING CONDENSED LIQUID

[75] Inventor: Hideo Seko, Hashima, Japan

[73] Assignee: Aisin Seiki Kabushiki Kaisha, Kariya, Japan

[21] Appl. No.: 370,852

[22] Filed: Jun. 23, 1989

[30] Foreign Application Priority Data

Jun. 23, 1988 [JP] Japan .................. 63-083376[U]

[51] Int. Cl.$^5$ ............... F01N 3/02; H05B 3/02
[52] U.S. Cl. ........................ 60/309; 165/907; 392/465
[58] Field of Search .............. 60/309; 165/907; 219/335

[56] References Cited

U.S. PATENT DOCUMENTS

| | | | |
|---|---|---|---|
| 2,921,432 | 1/1960 | Marcotte | 60/309 |
| 3,455,743 | 7/1969 | Huebscher | 165/907 |
| 3,782,115 | 1/1974 | Johnson | 60/309 |
| 4,833,373 | 5/1989 | Doi et al. | |

FOREIGN PATENT DOCUMENTS

| | | |
|---|---|---|
| 59-8548 | 1/1984 | Japan . |
| 59-40145 | 3/1984 | Japan . |
| 61-30552 | 2/1986 | Japan . |
| 62-238149 | 10/1987 | Japan . |
| 62-191550 | 12/1987 | Japan . |

Primary Examiner—Douglas Hart
Attorney, Agent, or Firm—Burns, Doane, Swecker & Mathis

[57] ABSTRACT

The invention is directed to an arrangement by which harmful or noxious substances such as NOx or SOx may be evaporated from a gas heated pump system. The deletion of the substances is provided by heating a portion of the exhaust system in which the substances would collect. The heating evaporates the substances before they can be emitted to the atmosphere.

6 Claims, 2 Drawing Sheets

APPARATUS FOR EVAPORATING CONDENSED LIQUID

BACKGROUND OF THE INVENTION

1. Field of the Invention

The present invention relates to an apparatus for evaporating condensed liquid.

2. Description of the Related Art

At the beginning of the cooling process in a gas heat pump system, condensed liquid is sometimes generated in a heat exchanger. Since the condensed liquid includes some harmful substances such as NOx or SOx, these substances have to be deleted so as to prevent being exhausted into the atmosphere.

In the conventional gas heat pump system, a filter is employed to delete these substances. The filter is provided at an exit side of the exhaust pipe. However, the effect of such filter, unfortunately, cannot satisfy the required cleaning by filtering operation.

SUMMARY OF THE INVENTION

It is, therefore, a principal object of the invention to provide an apparatus for evaporating condensed liquid.

It is another object of this invention to provide an apparatus for evaporating condensed liquid with an apparatus which is resistant to sudden increases in temperature.

Other objects, advantages and novel features of the present invention will become apparent from the following detailed description of the invention when considered in conjunction with the attached drawings.

DETAILED DESCRIPTION OF THE PREFERRED EMBODIMENTS

Figure 1:
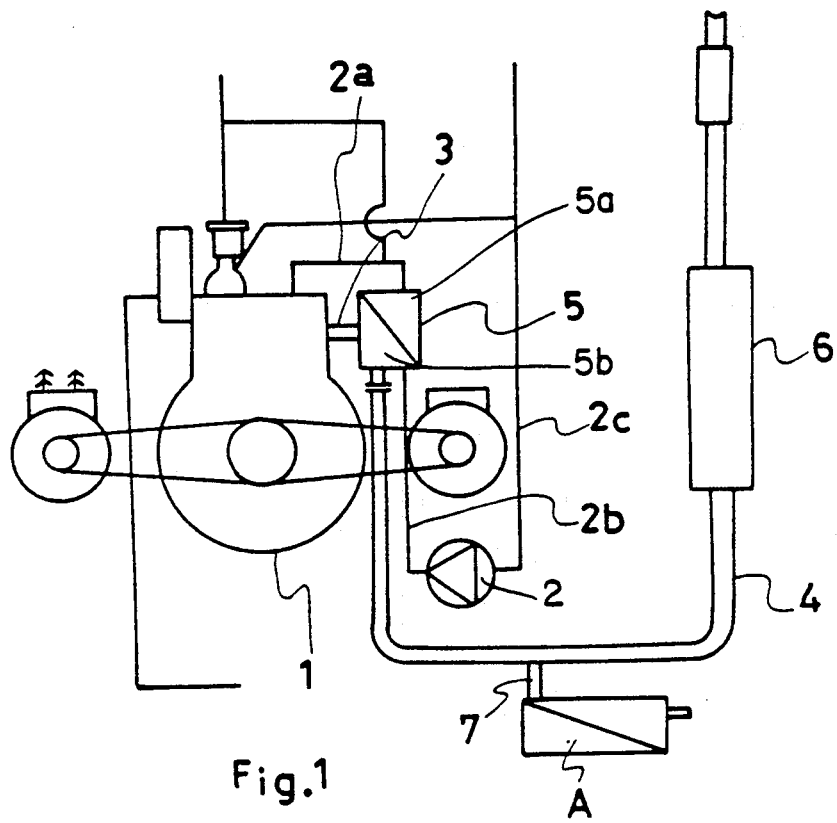
FIG. 1 shows a block diagram for illustrating the overall configuration of a gas heat pump system to which this invention is applied.

Referring now to FIG. 1, a gas heated pump system include a gas engine 1, a pump 2, conduits 2a, 2b and 2c through which a cooling medium (for example water) flows, exhaust pipes 3 and 4, and a heat exchanger 5. The heat exchanger 5 includes a first portion 5a arranged between the conduits 2a and 2b and a second portion 5b arranged between the exhaust pipes 3 and 4. A muffler 6 is connected to the exhaust pipe 4. A condensed liquid evaporator A is connected to the exhaust pipe 4 via a support pipe 7. When the gas engine 1 is driven, the temperature of the heat exchanger 5 is abruptly increased. The temperature increase causes the condensed liquid to be generated in the heat exchanger 5. The condensed liquid flows into the exhaust pipe 4 under the force of gravity. As a result, the condensed liquid flows into the condensed liquid evaporator A via the exhaust pipe 4 and the support pipe 7.

Figure 2:
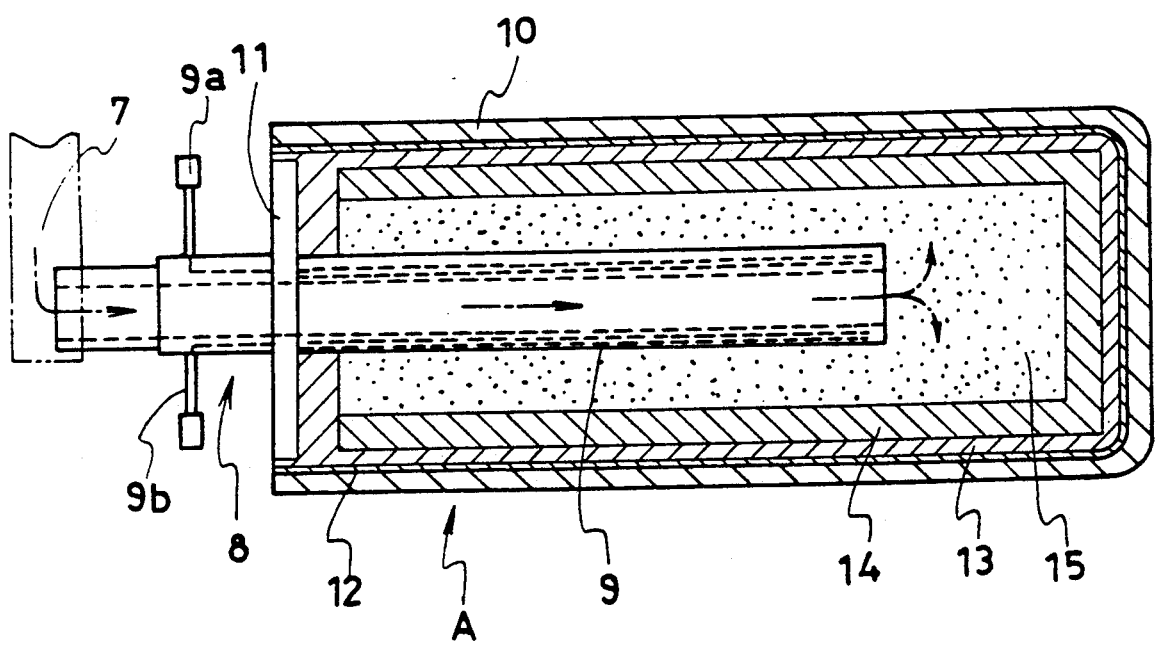
FIG. 2 shows a sectional view of an apparatus for evaporating condensed liquid according to a first embodiment of this invention.

FIG. 2 shows a sectional view of the condensed liquid evaporator A according to the invention. The support pipe 7 is connected to a heat pipe 8 of the condensed liquid evaporator A. The heat pipe 8 is made of ceramic material, for example. A heating arrangement or element 9 is provided in a wall of the heat pipe 8. A pair of electric terminals 9a and 9b are arranged at an outer periphery of the heat pipe 8. The terminals 9a and 9b are electrically connected to the heating element 9. The heat pipe 8 is supported by a support plate 11 of a casing 10. The support plate 11 being in the form of a cantilever configuration. The casing 10 is made of stainless steel. On the inner surface of the casing 10, an acid-proof coating 12 is provided. As a material of the acid-proof coating 12, for example, zirconium group material or carbide-tungsten is available. A heat insulator 13 is arranged in the casing 10 and an inner casing 14 is arranged at an inner portion of the heat insulator 13. The inner casing 14 is made of porous ceramic material. A powder ceramic material 15 is filled in a space which is defined between the heating element 9 and the inner casing 14. The powder ceramic material 15 has to be a porous ceramic material. The heat pipe 8 forms a tube, and the condensed liquid flows along the inner tube portion of the heat pipe 8. During the flow of the condensed liquid, the harmful substances such as NOx and/or SOx are decomposed by heat. As soon as the heat pipe 8 is turned on, it is warmed up to a temperature above 200° C. This temperature is kept so long as the heat pipe 8 is turned on.

Figure 3:
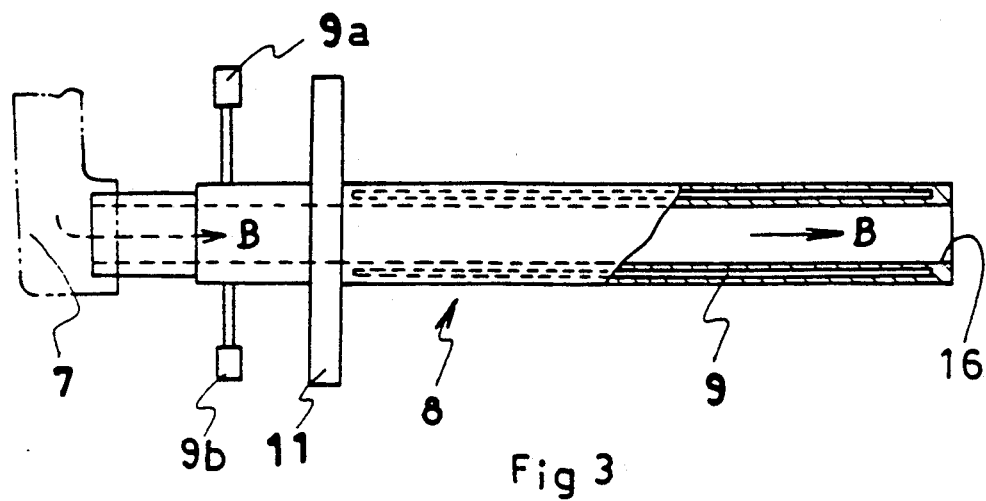
FIG. 3 shows an enlarged-scale sectional view of a portion of a heat pipe shown in FIG. 2.

FIG. 3 shows a partially sectional view of the heat pipe 8. An arrow B shows the flow direction of the condensed liquid. The condensed liquid is heated within the heat pipe 8 and quickly evaporates. During the evaporating process, the harmful substances which are contained in the condensed liquid are decomposed when the temperature is increased by the heating element 9. Any remaining condensed liquid and the evaporated gas flow into the powdery ceramic material 15 from an opening 16 of the heat pipe 8. The powder ceramic material 15 can absorb the remaining condensed liquid and the evaporated gas.

Figure 4:
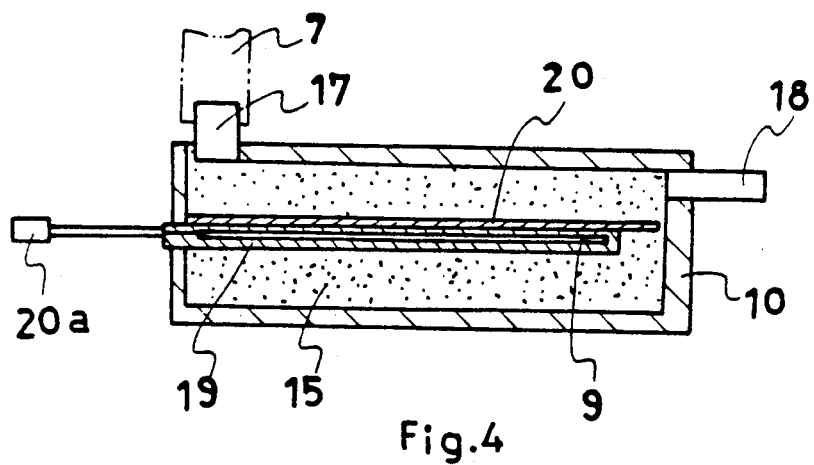
FIG. 4 shows a section view of an apparatus for evaporating condensed liquid according to a second embodiment of this invention.

FIG. 4 shows a second embodiment of the invention. The casing 10 has an inlet port 17 connected to the support pipe 7 and an outlet port 18 opening to atmosphere. A heat plate 19 is inserted into the casing 10, and the heating element 9 is arranged in the heat plate 19. A heat insulator 20 in the form of a flat plate is arranged in the heat plate 19. The heat plate 19 is supplied with electric current via a pair of terminals 20a, 20a (only one is shown). The powder ceramic material 15 is filled in the casing 10. It should be noted that the heat insulator 20 prevents lowering of the temperature of the heat plate 19 when the condensed liquid is directly supplied.

Figure 5:
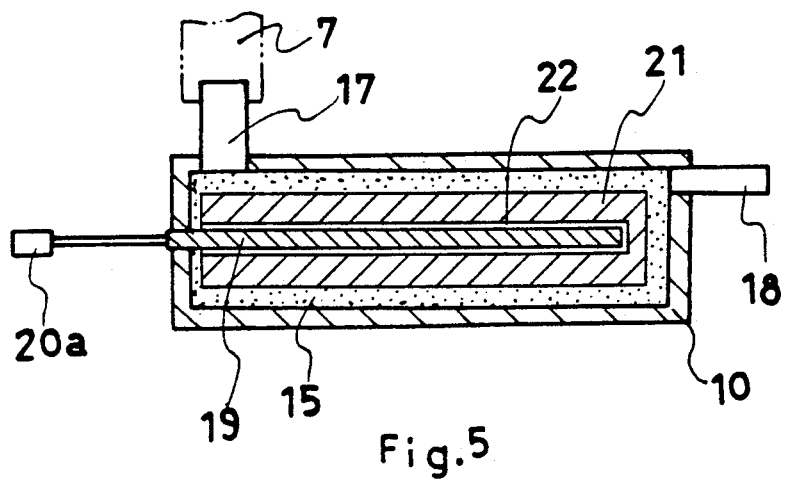
FIG. 5 shows a section view of an apparatus for evaporating condensed liquid according to a third embodiment of this invention.

FIG. 5 shows a third embodiment of the invention. In the third embodiment, instead of the heat insulator 20 in the second embodiment, a sleeve 21 is employed which is made of porous ceramic material. The sleeve 21 prohibits sudden increases of temperature of the powder ceramic material 15. A space 22 is defined between the heat plate 19 and the sleeve 21.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An apparatus for evaporating condensed liquid in a gas heat pump comprising;
   a casing having therein a space;
   a powdery ceramic material provided in the casing;
   inlet means for guiding the condensed liquid into the casing; and
   heating means for heating the condensed liquid within the casing.

2. An apparatus according to claim 1 in which the heating means includes a pipe and a member provided within the pipe to be heated to a predetermined temperature.

3. An apparatus according to claim 1 in which the heating means includes a pipe having therein a passage defining the inlet means and a member provided within the pipe to be heated to a predetermined temperature.

4. An apparatus according to claim 1 in which the powdery ceramic material is porous ceramic material.

5. An apparatus according to claim 1 in which the heating means includes a plate and a member provided in the plate to be heated to a predetermined temperature.

6. An apparatus according to claim 1 in which the heating means includes a member provided to be heated to a predetermined temperature and a porous ceramic material body for receiving the member.

* * * * *